(12) United States Patent
Butterly et al.

(10) Patent No.: US 10,115,157 B2
(45) Date of Patent: *Oct. 30, 2018

(54) EXCHANGE FOR DERIVATIVE PRODUCTS CONTINGENT ON ODDS-BASED MARKETS

(71) Applicant: Marketmaker Software Limited, Dublin (IE)

(72) Inventors: Marc Butterly, Dublin (IE); David Edelman, Dublin (IE)

(73) Assignee: Marketmaker Software Limited, Dublin (IE)

( * ) Notice: Subject to any disclaimer, the term of this patent is extended or adjusted under 35 U.S.C. 154(b) by 366 days.

This patent is subject to a terminal disclaimer.

(21) Appl. No.: 13/916,142

(22) Filed: Jun. 12, 2013

(65) Prior Publication Data
US 2013/0317969 A1 Nov. 28, 2013

(51) Int. Cl.
*G06Q 40/04* (2012.01)
*G06Q 50/34* (2012.01)

(52) U.S. Cl.
CPC ............. *G06Q 40/04* (2013.01); *G06Q 50/34* (2013.01)

(58) Field of Classification Search
CPC ........ G06Q 40/04; G06Q 40/06; G06Q 30/06; G06Q 30/08; G06Q 10/0639; G06Q 30/0613
USPC .......................................................... 705/37
See application file for complete search history.

(56) References Cited

U.S. PATENT DOCUMENTS 7,233,922 B2 * 6/2007 Asher et al. ................. 705/36 R
2002/0099640 A1 7/2002 Lange
2003/0023546 A1 * 1/2003 Shepherd ........................ 705/38
2004/0193531 A1 * 9/2004 Amaitis et al. ................. 705/37
2004/0204216 A1 10/2004 Schugar
2009/0029766 A1 1/2009 Lutnick et al.

OTHER PUBLICATIONS

Mark Longo; The Outcome of Events: HedgeStreet and Philly Take a Lead in Strange New World; May 1, 2005; Securities Data Publishing; 10/3,K/21.
PR Newswire; First Information Provider of Sports and Political Futures; Aug. 18, 2003; (c) 2013 PR Newswire Association Inc.; 12/3;K/44.
PR Newswire; Online Gambling Raid Rattles Industry as AllSportsMarket.com Prepares for U.S. Regulation Busted International Online Gambling Ring Further Exposes Why U.S. Government May Seek Alternative to Prohibition; PR Newswire Association Inc.; Nov. 17, 2006; 12/3,K/38.

* cited by examiner

*Primary Examiner* — Alexander G Kalinowski
*Assistant Examiner* — Michael D Cranford
(74) *Attorney, Agent, or Firm* — Finnegan, Henderson, Farabow, Garrett & Dunner, LLP

(57) ABSTRACT

A method and system are described for creating an exchange for futures products for odds markets based on binary outcomes. The futures product is based on the value of a particular fixed index or an exchange delivery settlement price in odds form, as recorded or computed at the end of a pre-assigned event or time-horizon. A particular use of this product would be on an exchange for sporting events, where for a given event, an identical interface to that which would currently be available for odds markets is made available, but which would be settled differently from the former, in such a manner as to allow investors to take positions on the movement of the odds without exposure to the final outcome of the event.

28 Claims, 7 Drawing Sheets

EXCHANGE FOR DERIVATIVE PRODUCTS CONTINGENT ON ODDS-BASED MARKETS

CROSS-REFERENCE TO RELATED APPLICATION

This application is a continuation of U.S. patent application Ser. No. 12/110,068, filed Apr. 25, 2008, which claims priority to Irish Patent Application No. S2007/0309, filed Apr. 26, 2007, and also to Irish Patent Application No. S2007/0498, filed Jul. 10, 2007, the contents of each of which are hereby incorporated by reference.

FIELD OF THE INVENTION

The present invention relates to an exchange for derivative products contingent on odds-based markets and to methods of determining the settlement price for such derivative products and of settling such derivative products.

BACKGROUND

Trading shares involves bringing individuals with disposable capital together with individuals who need an influx of capital to develop a business, and offer business shares in return for the disposable capital. Trading futures, however, brings people together to transfer the price risk associated with the ownership of some commodity or a service.

"Derivatives" is a term used to describe financial products, such as futures and options contracts, which are derived from other existing products. For example, equity futures and options are derived from equities in the underlying share market.

A futures contract is an agreement between a buyer and a seller to buy or sell a particular asset some time in the future at a price agreed today. Futures contracts may be cash-settled or require physical delivery of the underlying asset. For example, with equity futures, a cash-settled contract requires a cash amount to be paid on the settlement day, reflecting the difference between the initial futures price and the price of the underlying shares when the futures contract reaches maturity. In doing this, the investor can buy and sell contracts without ever owning the shares in the first place.

Options give investors the right, but not the obligation, to buy or sell a specific product or asset at a fixed price on or before a specific date. Unlike futures contracts, the potential loss to the buyer of an option is limited to the initial price (or premium) paid for the contract, regardless of the performance of the underlying product, e.g. shares. Like futures, options can be used to try to capitalise on an upward or downward movement in the market, but also generate returns in a static market.

In a similar manner as an insurance contract allows the owner of an asset to protect it for a premium, futures and options contracts allow investors to protect their investments. For example, suppose a fund manager knows they will have a certain amount of money to invest in shares at a fixed time in the future, but they believe the market is going to rise and there is a risk they will have to pay a lot more for the shares. They can purchase options on the same shares for a relatively small outlay (called a premium), and use the profit from the options to offset the higher price they would have to pay for the shares when the money becomes available.

Online exchanges have recently become popular, wherein individuals may provide offers and/or take positions, typically on binary outcome events, such as sporting events or spreads of financial market indices. Many of the participants in these markets are interested in taking positions to profit from beliefs of market behaviour, rather than from the outcome of the events on which these 'spot' markets are based. Whilst such individuals may alternately take long and short positions on odds markets to achieve this, the conducting of such trades is difficult for even the most experienced of individuals. Thus, as in other types of markets, derivatives markets have become more popular than the spot markets on which they are based.

SUMMARY

A novel futures product based on odds expectations is defined and explained hereinafter for simplifying the conducting of trades on odds markets, and a novel system for trading this product is likewise disclosed.

According to an aspect of the present invention, a system for processing trades contingent on odds-based markets is provided, which comprises means for receiving odds $S_T$ for at least one exogenous reference market, wherein odds $S_T$ correspond to a specified reference outcome to be decided at a time later than a specified time T; means for receiving, from trade parties, forecasts $F_t$ and investment amounts $a_t$ time t for the settlement of odds $S_T$ for the exogenous reference market at the specified time T, wherein the trade parties comprise at least one trade party for a positive investment amount $a_t$ and at least one trade counter-party for a negative investment amount $a_t$; means for registering at least one trade ($F_t$, $a_t$) between the trade parties prior to time T, the trade having a conditional value equal to zero at any time prior to time T; and means for confirming, in response to the odds $S_T$, the payoff to or the liability of the at least one trade party as equal to $a_t(F_t/S_T-1)$, and respectively, the liability of or the payoff to the at least one trade counter-party as equal to $-a_t(F_t/S_T-1)$.

In a preferred embodiment, the system comprises means for settling the trade value, further to the confirmation of the respective payoff and liability. The system desirably defines an exchange for the trades.

In a first embodiment, the system comprises at least one data processing terminal, wherein the means for receiving odds forecasts and investment amounts, the means for registering at least one trade and the means for confirming the respective payoff and liability respectively comprise data processing terminal components suitably configured by data processing terminal instructions.

In a second embodiment, the system comprises a plurality of data processing terminals connected to a network and in communication with one another, wherein a first data processing terminal of the said plurality receives odds forecasts from at least a second data processing terminal of the said plurality, the first data processing terminal receives investment amounts from at least a third data processing terminal of the said plurality, the first data processing terminal registers at least one trade between the at least second data processing terminal and the at least third data processing terminal of the said plurality, and the first data processing terminal confirms the respective payoff and liability.

According to another aspect of the present invention, a method of settling trades contingent on odds-based markets is provided, which comprises the steps of receiving odds $S_T$ for at least one exogenous reference market, wherein odds $S_T$ correspond to a specified reference outcome to be decided at a time later than a specified time T; receiving, from trade parties, forecasts $F_t$ and investment amounts $a_t$ at time t, for the settlement of odds $S_T$ for the exogenous reference market as of the specified time T, wherein the trade parties comprise at least one trade party for a positive investment amount $a_t$ and at least one trade counter-party for a negative investment amounts $a_t$; registering at least one trade ($F_t$, $a_t$) between the trade parties prior to time T, the trade having a conditional value equal to zero at any time prior to time T; confirming, in response to the expiry odds $S_T$, the payoff to or the liability of the at least one trade party as equal to $a_t(F_t/S_T-1)$, and respectively the liability of or the payoff to the at least one trade counter-party as equal to $-a_t(F_t/S_T-1)$; and settling the trade value.

According to a further aspect of the present invention, a method of determining the settlement value $S_T$ for trades contingent on odds-based markets is provided, which comprises the steps of receiving a complete set of pairs ($V_t$, $S_t$) representing executed trades in at least one exogenous reference market, wherein odds $S_t$ and volume $V_t$ correspond to a specified reference outcome to be decided at a time later than a specified time T; and determining the settlement value $S_T$ for trades ($F_t$, $a_t$) comprising the median of the latest percentage of volume by the volume $V_t$ on the reference market prior to T, such that such that at least 50% of the latest percentage of traded volume is greater than or equal to $S_T$, and at least 50% of the latest percentage of traded volume is less than or equal to $S_T$.

In a first embodiment, the latest percentage of volume by traded amounts is comprised between 0.1% and 25%.

In a preferred embodiment, the latest percentage of volume by traded amounts is comprised between 9% and 11%.

According to yet another aspect of the present invention, a method of determining the settlement price $S_T$ for trades contingent on odds-based markets is provided, which comprises the steps of receiving a complete set of pairs ($V_t$, $S_t$) representing executed trades in at least one exogenous reference market, wherein odds $S_t$ and volume $V_t$ correspond to a specified reference outcome to be decided at a time later than a specified time T; and determining the settlement value $S_T$ for trades ($F_t$, $a_t$) comprising a trimmed mean of the latest percentage of volume by the volume $V_t$ on the reference market prior to T.

In a preferred embodiment, the trimmed mean is an average with a variable percentage, wherein extreme values on both positive and negative sides have been removed.

BRIEF DESCRIPTION OF THE DRAWINGS

An exemplary embodiment of the present invention is described herein with reference to the drawings, in which.

DETAILED DESCRIPTION

The invention is generally described herein by way of example, with reference to a preferred embodiment, and several alternative embodiments. It should be understood, however, that the invention can extend to apply in other arrangements as well.

Figure 1:
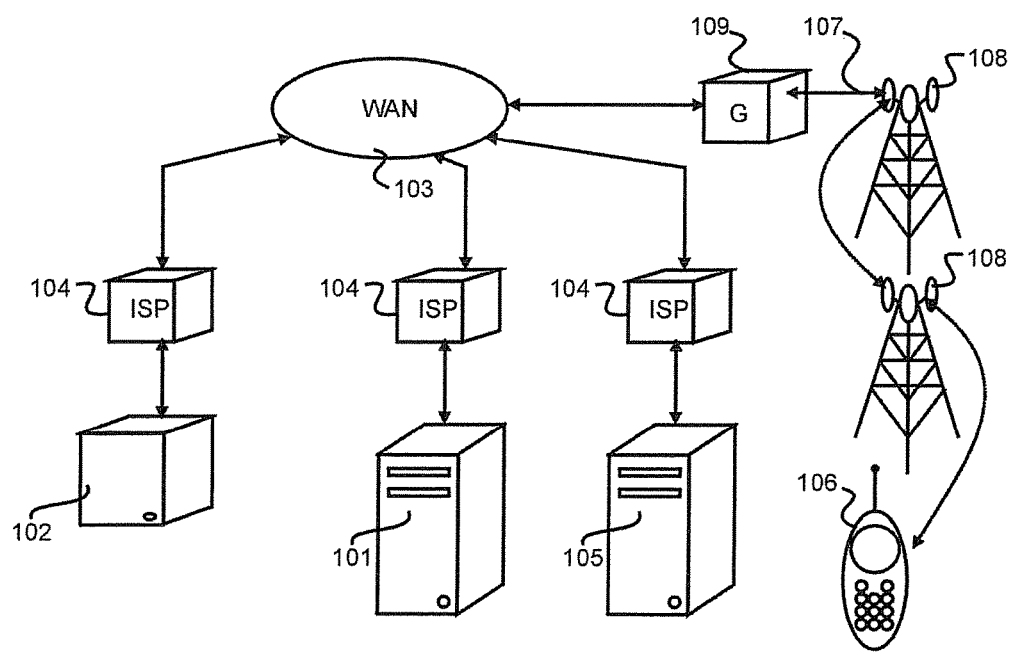
FIG. 1 illustrates a system in which a preferred embodiment of the present invention may be embodied, including a plurality of networked data processing terminals.

A preferred embodiment of the present invention is shown as a system in FIG. 1, which depicts a networked computerized trading system including a plurality of data processing terminals. Amongst the plurality of data processing terminals, a first data processing terminal 101 is configured according to the present invention, and is connected with further data processing terminals over a variety of wired and wireless networks.

In the example, terminal 101 is connected via a network with a second data processing terminal 102, which maintains at least one odds-based exogenous reference market. In the example, second terminal 102 is a networked betting exchange server, for instance such as the Betfair exchange administered by The Sporting Exchange company of London, United Kingdom, although it will be readily apparent to those skilled in the art that the second terminal may maintain any other type of exogenous reference market based upon binary outcomes, or that terminal 101 may itself maintain the at least one odds-based exogenous reference market and obtain a data feed from terminal 102 for this purpose, for instance as described in further details hereinafter. In the embodiment shown, terminal 101 is connected to a Wide Area Network (WAN) 103, of which the Internet is an example, via an Internet Service Provider (ISP) 104, and terminal 102 is likewise connected to the WAN 103 via another ISP or the same ISP 104.

Terminal 101 is also connected via a network with at least a third data processing terminal 105, at which a user generates at least one forecast and provides an indication of an investment amount corresponding to the forecast, from which terminal 101 generates a futures product according to the present invention. In the example, third terminal 105 is a networked personal computing device such as a desktop or laptop computer, and it will be readily apparent to those skilled in the art that the third terminal may be any type of personal data processing device capable of interfacing a network, receiving user input and forwarding same over the network. In the embodiment shown, terminal 105 is connected to the Wide Area Network (WAN) 103 via another ISP or the same ISP 104 as terminals 101 and 102.

Terminal 101 is also connected via a network with at least a fourth data processing terminal 106, at which a user at least provides an indication of purchase of the futures product generated by the terminal 101, based on the forecast and investment amount received from the third terminal 105. In the example, fourth terminal 106 is a networked mobile computing device such as a mobile telephone or a personal digital assistant, and again it will be readily apparent to those skilled in the art that the fourth terminal may be any type of personal data processing device capable of interfacing a network, receiving user input and forwarding same over the network. In the embodiment shown, terminal 106 is connected to the Wide Area Network (WAN) 103 via a low-bandwidth network connection Global System for Mobile Communication ('GSM') wireless network, or a higher-bandwidth General Packet Radio Service ('GPRS') wireless network, or a yet higher-bandwidth 'G3' wireless network 107. Fourth terminal 106 receives data from terminal 101 and transmits data back to terminal 101 as a digital signal over wireless network 107, wherein said signal is relayed respectively to or from the terminals 101, 106 by the geographically-closest communication link relay 108 of a plurality thereof, at least one of which is connected with a remote gateway 109 providing an interface with the WAN 103. Gateway 109 is for instance a communication network switch and provides protocol conversion if required, for instance because terminal 106 transmits data to terminal 101 which is formatted according to a cellular transmission protocol and, inversely, terminal 101 transmits data to terminal 106 which is formatted according to a WAN transmission protocol.

Thus, the potential exists for data exchange between any of terminals 101, 102, 105 and 106 by way of the WAN 103 and/or wireless network 107, interfaced by ISPs 104 and/or gateway 109. It will, however, be readily apparent to those skilled in the art that the above environment is provided by way of example only, and that the present invention may be embodied in any network comprising devices connected thereto exchanging data encoded as described herein.

Figure 2:
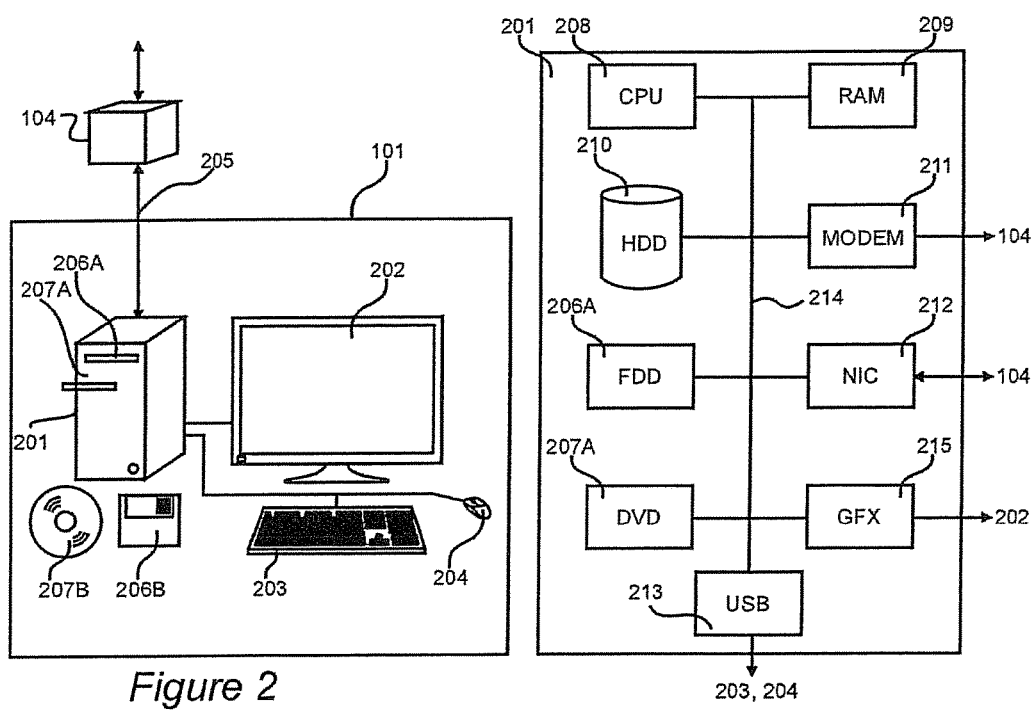
FIG. 2 further details the hardware components of a first data processing terminal shown in the system of FIG. 1, including processing means and memory means.

An example of terminal 101 shown in FIG. 1 is provided in FIG. 2. Terminal 101 is a computer terminal configured with a data processing unit 201, data outputting means such as video display unit (VDU) 202, data inputting means such as a keyboard 203 and a pointing device (mouse) 204 and data inputting/outputting means such as WAN connection 205, magnetic data-carrying medium reader/writer 206A and optical data-carrying medium reader/writer 207A. Reader/writer 206A preferably reads data and instructions for the processor described herein from magnetic media such as a floppy disk 206B and writes data processed by said processor thereto, and reader/writer 207A preferably reads data and instructions for said processor from optical media such as DVD-R 207B and writes data processed by said processor thereto.

Within data processing unit 201, a central processing unit (CPU) 208, such as a Core 2 Duo™ processor manufactured by the Intel®. Corporation, provides task co-ordination and data processing functionality. Instructions and data for the CPU 208 are stored in main memory 209 and a hard disk storage unit 210 facilitates non-volatile storage of data and sets of instructions for CPU 208. A modem 211 provides a first means for a wired connection to the ISP 104, for instance if the connection 205 is effected by a low-bandwidth dial-up service provider. A network interface card (NIC) 212 provides a second means for a wired connection to the ISP 104, for instance if the connection 205 is effected by a high-bandwidth cable modem (not shown). A universal serial bus (USB) input/output interface 213 facilitates connection to the keyboard and pointing device 203, 204 and may provide third means for a wired connection to the ISP 104, for instance if the connection 205 is effected by a high-bandwidth digital subscriber line (DSL) modem (not shown). All of the above devices are connected to a data input/output bus 214, to which said magnetic data-carrying medium reader/writer 206 and optical data-carrying medium reader/writer 207 are also connected. A video graphics adapter 215 receives CPU instructions over said bus 214 for outputting processed data to VDU 202.

In the preferred embodiment, data processing unit 201 is of the type generally known as a compatible Personal Computer ('PC'), but may equally be any device configured with data inputting, processing and outputting means providing at least the functionality described above.

Figure 3:
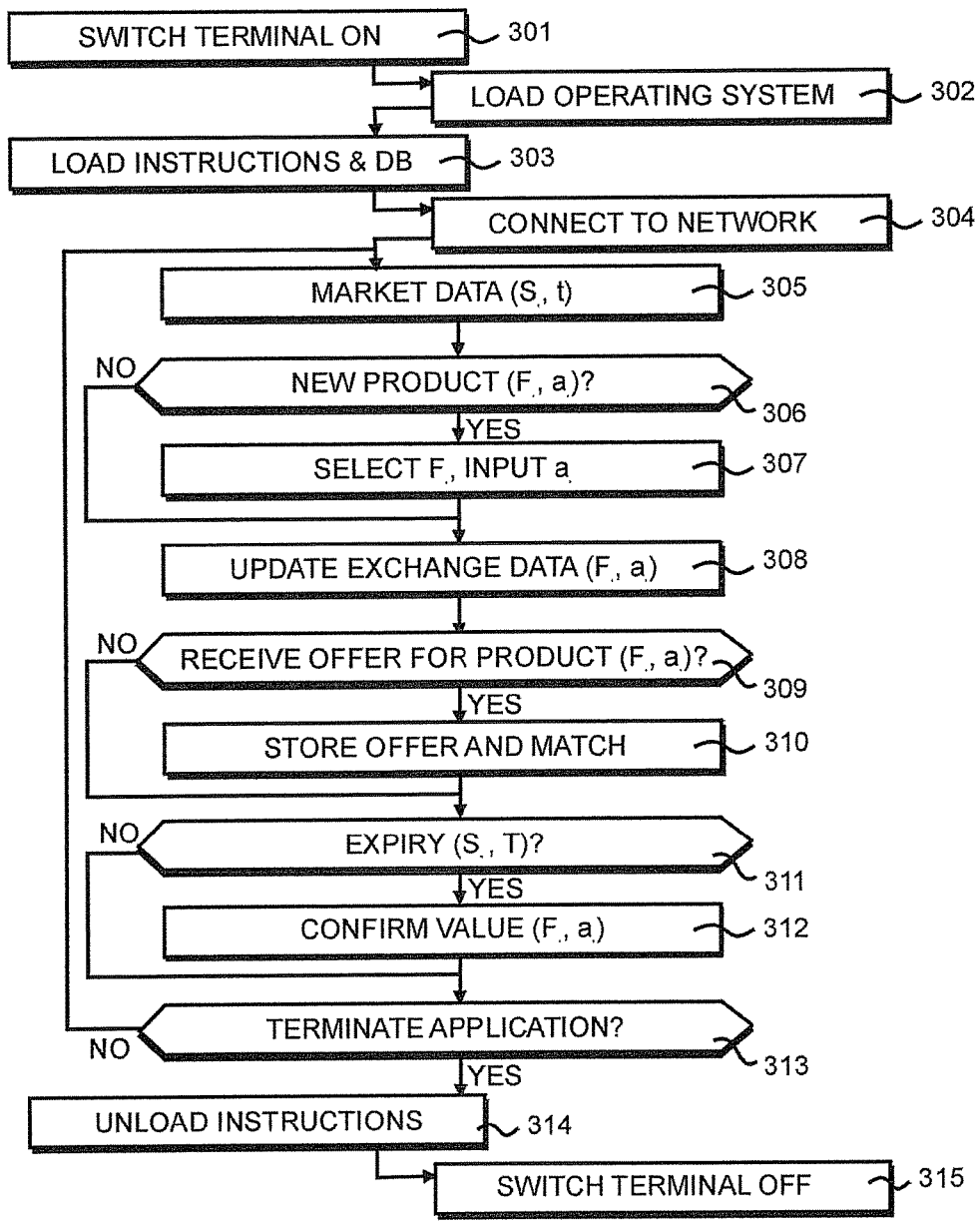
FIG. 3 details the processing steps according to which the first data processing terminal of FIGS. 1 and 2 operates according to a first embodiment the present invention.

Processing steps are described in FIG. 3, according to which terminal 101 operates a preferred embodiment of the present invention. Terminal 101 is first switched on at step 301. At step 302, a set of instructions is loaded which provides said terminal 101 with basic functionality, such as initialisation of data input and/or output devices, data file browsing, keyboard and/or mouse input data processing, video data outputting, network connectivity and network data processing. At step 303, an application is loaded into memory 209, which is a set of instructions for configuring CPU 208 to process data according to rules described hereafter. A data structure is also loaded at step 303, which stores futures trades as detailed hereinafter and a user account for any user who connects to terminal 101 for any of creating, buying and selling futures trades. Upon completing the above initialisation and loading of steps 301 to 303, terminal 101 is configured to receive and process network input data and to process and transmit network output data, whereby terminal 101 establishes the connection 205 to the system show in FIG. 1 at step 304.

In a preferred embodiment of the present invention, the exogenous reference market for a given event is produced as exogenous index odds for the given event at terminal 101 at step 305, by receiving a data feed over the WAN 103 from server 102 of all the odds being offered as liquid open interest for the various possible outcomes in that event, and by adjusting the best odds on offer for each outcome to define new exogenous index odds, so that the sum of the inverse (gross) exogenous index odds for all possible outcomes in the event is as close as possible to 1 (100%). The adjustment to a 100% market may be carried out in the following manner.

Let $W_1, W_2, \ldots W_m$ be the best price gross odds freely available for the various possibilities $1, 2, \ldots m$ at a given point in time, wherein it shall be assumed that the sum of $1/W_i$ amounts to a number greater than 1, with no adjustment required if the sum is less than or equal to 1.

Let $b_i$ be computed so that $H(b_i)=1/W_i$, wherein H is defined as the following approximation to the cumulative standard normal distribution:

$$H(x)=1/(1+\exp(-1.6*x-0.07*x^3))$$

Next, let d be computed so that the sum of $H(b_i-d)$ for a given event is 1. Then, for $i=1, 2, \ldots m$, the exogenous index odds prices are given by:

$$Y_i=1/H(b_i-d)$$

These exogenous index odds will be made available for public display, and the ultimate settlement prices for any futures markets based on the exogenous index odds shall be the levels of exogenous index prices as of the close of the futures market for that event. In an alternative embodiment, exogenous market data is received from exchange server 102 at step 305.

In the example, $S_T$ denote an S-for-1 odds position for an outcome on an existing 'spot' market, such as the exogenous market maintained at terminal 101 or server 102, wherein the position yields a gross payout of S units if the outcomes occurs and 0 units otherwise. S varies over a predetermined time bounded by an expiry T, for instance bounded by market close if the exogenous market is subject to specific activity periods. The Expiry T is selected as a point in time which is expected to be of interest to potential market participants. There may be markets with several sets of Expiries for the same event, such as some arbitrary time period before a scheduled event time, or an actual scheduled event time, or some arbitrary time period and/or length of the event. In the case of a horse race for example, such a set of expiry would comprise 10 minutes before a scheduled race time, the scheduled race time and after 400 meters of racing. Just as in traditional financial markets, there may be calendar index futures such as a set date.

At step 306, a first question is asked as to whether new forecast data $F_t$ has been received from at least a third terminal, such as terminal 105, in respect of odds defined in the exogenous market data received at step 305. $F_t$ denote a 'futures' trade price (i.e. forecast) for the 'settlement' value of $S_T$ on the market at expiry T. If the question is answered positively, then terminal 101 creates a new futures trade in the data structure at step 307, which is for instance a database of futures trades, and registers the trade price $a_t$ for the futures trade in the database. A futures trade (i.e. contract) bought at time t on the basis of $F_t$ for an investment of $a_t$ when the market settles at value $S_T$ will result in either a payout of $a_t(F_t/S_T-1)$ if $S_T$ is less than $F_t$, or a liability of $-a_t(1-F_t/S_T)$ if $S_T$ is more than $F_t$, with no disbursements occurring if $S_T$ and $F_t$ are substantially equivalent. The futures trade may be thought of as a delivery of an odds position on the market at an agreed price at the time of settlement, bundled together with an offsetting odds position on the market at the price of settlement, leading to a neutral position with regard to the actual event outcome.

Specifically, a position of (1-unit) on the event at odds $F_O$ on the actual exogenous market will result in a payout of either $F_t$ (if the outcome occurs) or 0. In order to offset this position with a position at odds $S_T$, a stake of $F_t/S_T$ would need to be sold on the exogenous market. Thus, the net change in position would be $F_t/S_T-1$, and the net position on the exogenous market would be null: the position would be entirely neutral with respect to the occurrence or non-occurrence of the outcome. According to the example above, the maximum liability of one unit long in the futures trade is $-1$, and the maximum gain is $F_t-1$. At step 308, terminal 101 updates the exchange data which is sent to connected remote user terminals, such as terminal 106, in the form of replies to database queries or periodically, and which comprises any one, a selection, or all of the futures trades $(F_t, a_t)$ stored in the database.

A second question is asked at step 309, as to whether an offer has been received for a futures trade $(F_t, a_t)$ stored in the database. An offer is received from an individual submitting, via a network-connected terminal configured with a suitable interface, such as terminal 105 or 106, on the exchange maintained at terminal 101 whereat the individual has deposited funds, futures price bids both long and short in respect of a futures trade $(F_t, a_t)$ and get matched with other individuals' bids on a first-come first-served basis when 'bid' and 'offer' prices agree. Thus, if the question is answered positively, then the offer is temporarily stored at step 310 and a first attempt is made to match the offer with the product. If the first attempt at matching is unsuccessful, the offer remains temporarily stored and subsequent matching attempts are performed during each iteration of the process delimited by step 305 to 313, until the Expiry, at which time offers cannot be matched anymore. Unmatched offers at expiry are removed from storage. Alternatively, the offer is matched and, at the next update of the exchange data at the next iteration of step 308, is removed from temporary storage and included in the exchange data.

Alternatively, the question of step 309 is answered negatively and a third question is asked at step 311, as to whether an expiry T has been reached in respect of anyone futures trade $(F_t, a_t)$ stored in the database. If the question is answered positively, then the settlement value of the futures trade is processed at step 312, in accordance with the parameters described hereinabove. In an advantageous alternative embodiment of the present invention, the application incorporates movement limits, whereby a percentage $\alpha$ (representing an extreme percentage move) may be set, so that for any given trade at price $F_t$, the price at which the trade is settled is limited to lie between $a_t(F_t/(1+\alpha))$ and $a_t(F_t/(1-\alpha))$, so that the change in the position is between $F_t/(F_t/(1-\alpha))-1=-\alpha$ and $F_t/(F_t/(1+\alpha))-1=\alpha$, wherein $\alpha$ is a value typically less than or equal to 50%. As a result of processing the settlement value, the respective user accounts of the users who have bought the futures trade $(F_t, a_t)$ at expiry are credited or debited in accordance with whether the settlement value respectively represents a payoff or a liability.

Alternatively, the question of step 311 is answered negatively, and a fourth question is asked at step 313, as to whether the user of terminal 101 may then decide to terminate the processing of the application first loaded at step 303. If the question is answered negatively, control returns to step 305 for the purpose of receiving updated exogenous market data, and thereafter process further futures trades. The uninterrupted combined cycle of steps 305 to 312 in effect results in a futures exchange for odds-based exogenous markets. However, if the question is answered positively, then the instructions and the database first loaded at step 303 are unloaded from memory 209 at step 314, and the terminal may eventually be switched off at step 315.

Figure 4:
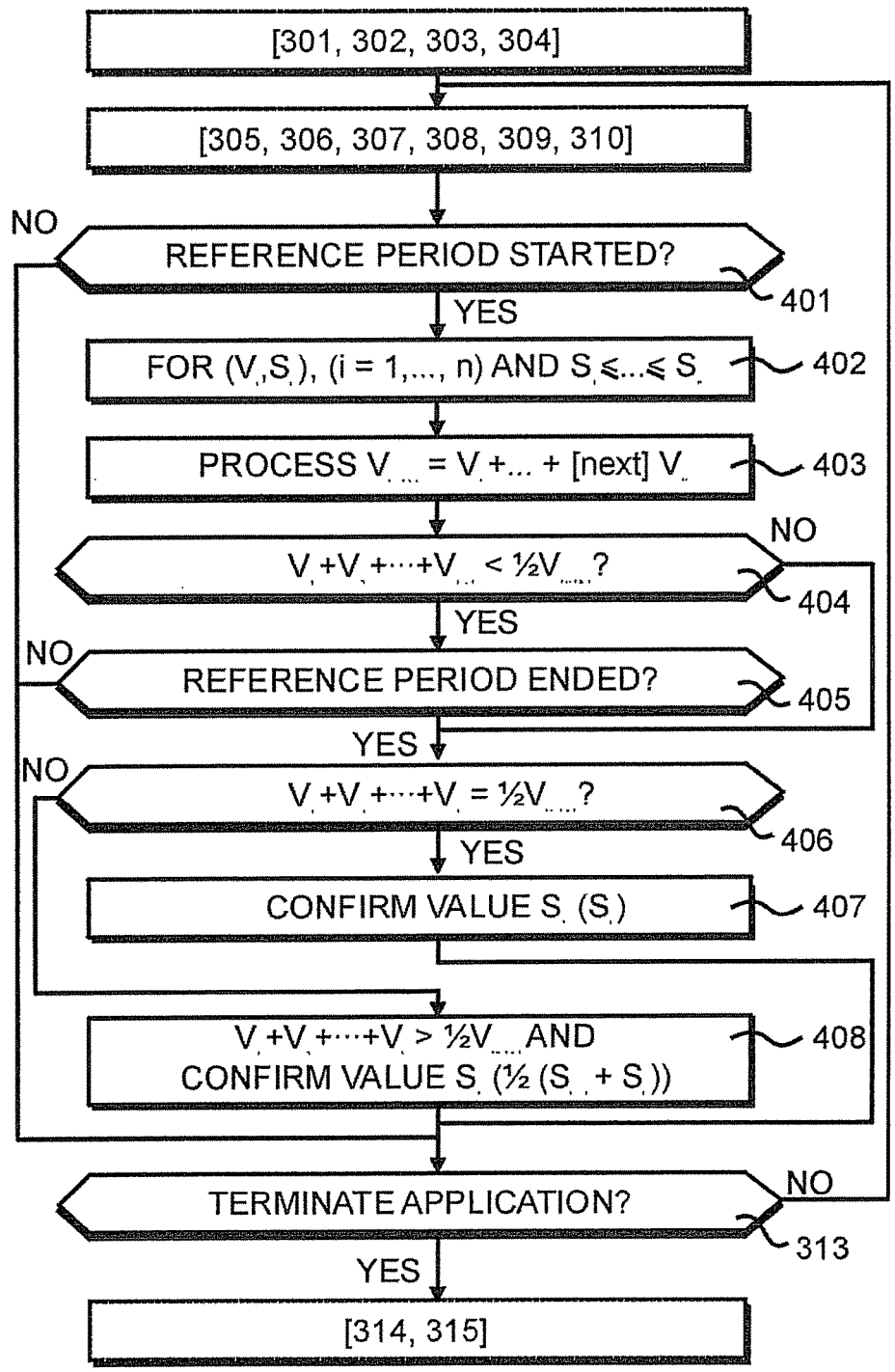
FIG. 4 details the processing steps according to which the first data processing terminal of FIGS. 1 and 2 operates according to a second embodiment the present invention.

Processing steps are described in FIG. 4, according to which terminal 101 operates an alternative embodiment of the present invention. Terminal 101 is again first switched on at step 301. At step 302, the set of instructions is loaded which provides said terminal 101 with basic functionality, such as initialisation of data input and/or output devices, data file browsing, keyboard and/or mouse input data processing, video data outputting, network connectivity and network data processing. At step 303, an application is loaded into memory 209, which is a set of instructions for configuring CPU 208 to process data according to rules described hereafter. A data structure, such as a database, is also loaded at step 303, which stores futures trades as detailed hereinafter and a user account for any user who connects to terminal 101 for any of creating, buying and selling futures trades. Upon completing the above initialisation and loading of steps 301 to 303, terminal 101 is optimally configured to receive and process network input data and to process and transmit network output data, whereby terminal 101 establishes the connection 205 to the system show in FIG. 1 at step 304.

At step 305, exogenous market data such as odds $S_T$ and corresponding period expiry data T is again received by terminal 101. At step 306, a first question is asked as to whether new forecast data $F_t$ has been received from at least a third terminal, such as terminal 105, in respect of odds defined in the exogenous market data received at step 305. If the question is answered positively, then terminal 101 creates a new futures trade in the database of futures trades at step 307, and registers the trade price $a_t$ for the futures trade in the database. At step 308, terminal 101 updates the exchange data which is sent to connected remote user terminals, such as terminal 106, in the form of replies to database queries or periodically, and which comprises any one, a selection, or all of the futures trades $(F_t, a_t)$ stored in the database.

In any futures market, precautions must be taken to avoid manipulation of futures settlements via manipulation of the index or exogenous market on which the futures trades are based. The most common method of achieving this is to define a robust Exchange Delivery Settlement Price (EDSP), which is typically a trimmed average of index prices towards the expiry of the trades. It is important that this formula be relatively simple, publicly available, and impervious to manipulation. While there are several common classes of formulae which might be used to achieve this, analysis of market data and simulated stress tests have suggested the median of the last quarter by volume of turnover before expiry. In the preferred embodiment, the median is the value $S_T$ such that:

$$\sum_{i:\, S_i \geq S_T} V_i \geq \frac{1}{2} \sum_{All\, i} V_i$$

and $$\sum_{i:\, S_i \leq S_T} V_i \geq \frac{1}{2} \sum_{All\, i} V_i$$

i.e. at least 50% of volume is at least as high as (i.e. greater than or equal to) $S_T$, and at least 50% of volume is at least as low as (i.e. less than or equal to) $S_T$. In an alternative embodiment, the median is replaced by a trimmed mean, i.e. an average with a certain percentage of extreme values on both positive and negative sides removed.

In this embodiment, the settlement value $S_T$ of a trade is processed as follows. A question is asked at step 401, as to whether a predetermined reference period of trading has started for the computation of a volume-weighted median of trades $(S_i, V_i)$, wherein indicia i=1, 2, . . . , n and the contracts consist of amounts $V_i$ at odds $S_i$ occurring in the final reference period of trading. If the question of step 401 is answered negatively, control proceeds to the question of step 313, described above and again further below for reference. Alternatively, the question of step 401 is answered positively, and conditions are declared for the computation at step 402: it is preferable that the odds $S_i$ be ordered, such that $S_1 < S_2 < \ldots < S_n$, and $V_{total}$ denotes the total volume of trades during the reference period: $V_{total} = V_1 + V_2 + \ldots + V_n$. At step 403, $V_{total}$ is processed as the total of the trades performed since the beginning of the reference period. For example, only one trade has been processed since the beginning of the period, then $V_{total} = V_1$. Likewise, if two trades have been processed since the beginning of the period, then $V_{total} = V_1 + V_2$, and so on and so forth.

A question is next asked at step 404, as to whether the processed value of $V_{total}$ as of the past iteration of step 403 is less than half of $V_{total}$. If the question of step 404 is answered positively, a next question is asked at step 405, as to whether the predetermined reference period of trading has ended. If the question of step 405 is answered negatively, control proceeds to the question of step 313, described above and again further below for reference. Alternatively, if either the question of step 404 is answered negatively (signifying that the processed value of $V_{total}$ as of the past iteration of step 403 is more than half of $V_{total}$), or the question of step 405 is answered positively (signifying that the predetermined reference period of trading has ended), then a next question is asked at step 406, as to whether the processed value of $V_{total}$ as of the past iteration of step 403 is equal to half of $V_{total}$.

If the question of step 406 is answered positively, then the settlement value of the trade $S_T$ is defined as $S_k$ at step 407 and control then proceeds to the question of step 313.

Alternatively, the processed value of $V_{total}$ as of the past iteration of step 403 must amount to more than half of $V_{total}$, and in this case the settlement value of the trade $S_T$ is defined as $[(S_k-1+S_k)/2]$ at step 408, and control then proceeds to the question of step 313.

The application loaded at step 303 in effect determines the settlement value $S_T$ for trades $(F_t, a_t)$ by calculating the median of the latest percentage of volume by traded amounts $V_t$ on the reference market prior to T, such that at least 50% of the latest percentage of volume is greater than or equal to $S_T$, and at least 50% of the latest percentage of volume is less than or equal to $S_T$: the application bounds the settlement value of the futures trade at expiry at step 402 such that at least 50% of the latest percentage of volume is greater than or equal to $S_T$, and the application bounds the settlement value of the futures trade at expiry at step 403 such that at least 50% of the latest percentage of volume is lesser than or equal to $S_T$. As a result of processing the settlement value $S_T$, the respective user accounts of the users who have bought the futures trade $(F_t, a_t)$ at expiry are credited or debited in accordance with whether the settlement value respectively represents a payoff or a liability.

The question is asked at step 313, as to whether the user of terminal 101 may then decide to terminate the processing of the application first loaded at step 303. If the question is answered negatively, control returns to step 305 for the purpose of receiving updated exogenous market data, and thereafter process further futures trades. The uninterrupted combined cycle of steps 305 to 312, incorporating value settlement calculation of steps 401 to 408, in effect results in a tamper-proof futures exchange for odds-based exogenous markets. However, if the question is answered positively, then the instructions and the database first loaded at step 303 are unloaded from memory 209 at step 314, and the terminal may eventually be switched off at step 315.

Some exogenous markets are known to be subjected to external events beyond the control of the market administering system. For example, in a betting market for equestrian races, individual horses are frequently retired from a race moments before the start of the race due to unforeseen circumstances. Such external influences require corresponding adjustments of the prices on the exogenous market, and in an alternative embodiment of the present invention, the futures market may either suspend trading and nullify all trades, or adjust all settlement prices in a manner reflecting the adjustment in the exogenous market, as a contingency. For example, if an external event occurs and the exogenous market is corrected by fixed percentage decrease of 25% of all (gross) odds, then a futures trade entered into in respect of odds afflicted by the correction will be similarly reduced by 25%, in 'parallel' with the exogenous market.

Figure 5:
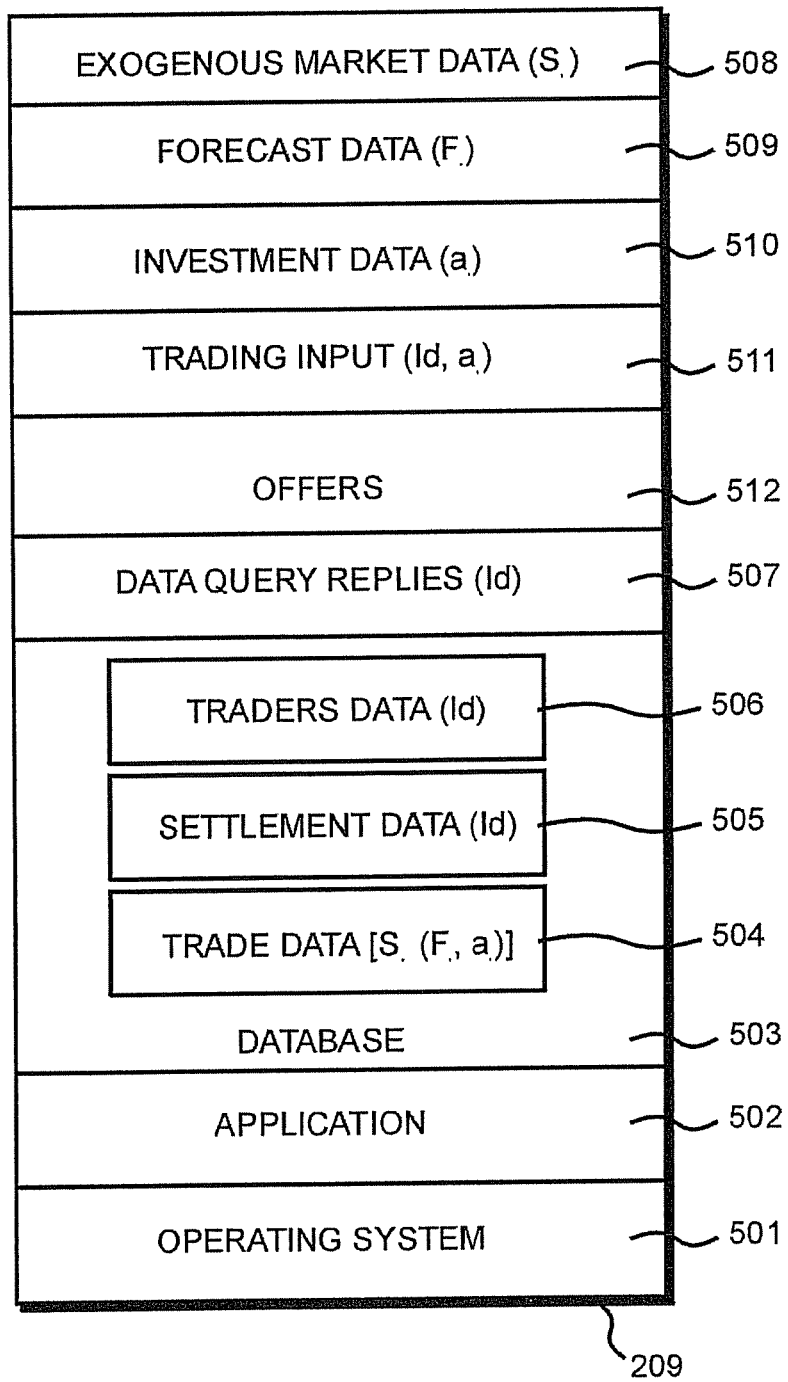
FIG. 5 illustrates the contents of the memory means shown in FIG. 2 at runtime, including several data structures.

The contents of the memory 209 of terminal 101 at any given time during the processing of data with the application according to the invention, such as shown in FIGS. 3 and 4 by way of example, are further detailed in FIG. 5.

An operating system is first shown at 501, which corresponds to the set of instructions loaded at step 302 for providing terminal 101 with basic functionality, such as initialisation of data input and/or output devices, data file browsing, keyboard and/or mouse input data processing, video data outputting, network connectivity and network data processing. An application is shown next at 502, which corresponds to the set of instructions loaded at step for configuring CPU 208 to process data as detailed above.

A database is shown next at 504, which corresponds to the data structure also loaded at step 303 for storing futures trades as detailed above. The database preferably stores futures trade data 504 comprising at least the respective data defining each trade ($F_t$, $a_t$). The database also preferably stores settlement data 505 comprising at least a respective unique identifier for each party to any trade 504, the said each parties comprising at least one trade party, in the example the user of terminal 106, and one trade counterparty, in the example the user of terminal 105. The database preferably further stores unique user account or registration data 506, or unique terminal account or registration data 506, for at least uniquely identifying each trade party or counterparty in the system and validating access to the said system.

Query replies are shown at 507, which are data packets processed by application 502 for communication to any connected terminal in the system to which it is connected, such as market data supplying terminal 102, forecasting and trade offering terminal 105 and trade contracting terminal 106, as a reply to a respective query from the said any terminal. Typically, such query replies comprises trade data ($F_t$, $a_t$) 504, and/or settlement data 505, and/or trade parties data 506.

Exogenous market data is shown at 508 as data received from terminal 102 before its inclusion in data structure 503 under the form of in trades 504. Exogenous market data 508 may be stored at terminal 101 for data correlation and/or verification purposes independently of the trades 504 since, in the system of FIG. 1, the user at any third-party terminal 105, 106 may access exogenous market data 508 independently of terminal 101 and directly from terminal 102. Forecast data $F_t$ and investment amount indication data at received from the at least third data processing terminal 105 are respectively shown at 509 and 510, from which the application 502 generates and stores the trades data 504. Purchase decision data 511 received from the at least fourth data processing terminal 106 is shown at 511, the simplest embodiment of which is a relevant portion of the unique terminal account or registration data 506 of the user of terminal 106, or of terminal 106. Memory portion 512 stores the offers received at step 309 and temporarily stored at step 310, before their matching and until the expiry of the market event to which they respectively relate.

This system is ideally suited to an online exchange, whereby individuals submit, via a suitable interface, on an exchange where they have deposited funds, futures price bids both long and short and get matched with other individuals' bids on a first-come first-served basis when 'bid' and 'offer' prices agree. Prices on a futures market may be interpreted as market expectations of final odds on a spot market, in a manner which is intuitively clear to experienced and relatively inexperienced market participants alike. Each time an individual enters into a position, a 'hold' is placed on a portion of their funds to the extent of their maximum liability, as determined by their position. In the alternative embodiment illustrated in FIG. 4, the extent of their maximum liability is as determined by their position and by the limit on price movements.

In an alternative embodiment, movement limits may be imposed on the Settlement Price, in accordance with practice on many traditional Futures Exchanges internationally. This option permits leveraged positions, as the maximum loss for a given contract may be significantly reduced. This embodiment may be carried out by the following modification of the settlement formula. For a futures price F and a final settlement price S, for a 1 unit contract, the following pre-commission settlement amounts apply:

to the Buyer (without limits): (F/S−1)
to the Seller (without limits): (1−F/S)

and the corresponding amounts would be:
to the Buyer (with limits): max(min(F/S−1,K−1),1/K−1)
to the Seller (with limits): min(max(1−F/S,−K+1),−1/K+1)

Note that the function min(x,y) equals the lesser of x and y, and the function max(x,y) equals the greater of x and y. Typical values of K would be 1.50, 2.0, 3.0 and so on and so forth. By way of example, for F=20, S=10 and K=1.5,
to the Buyer (without limits): (F/S−1)=(20/10−1)=1
to the Seller (without limits): (1−F/S)=−1
to the Buyer (with limits): max(min(F/S−1,K−1),1/K−1)
=max(min(1,0.5),−0.33)=0.5
to the Seller (with limits): max(−F/S,−K)=min(max(−1,−0.5),0.33)=−0.5

However, for F=20 and K=1.5 still, the limits would have no effect if S is greater than 13.33. The maximum potential loss per unit of contract for the seller is reduced from F−1 to K−1. Thus a seller for F=20 when K=1.5 would have exposure reduced from 19 per unit of contract to 0.5 per unit of value of the contract.

On the other hand, by way of another example, suppose F=2.0, S=50 and K=1.5,
to the Buyer (without limits): (F/S−1)=(2/50−1)=−0.96
to the Seller (without limits): (1−F/S)=0.96
to the Buyer (with limits): max(min(F/S−1,K−1),1/K−1)
=max(min(−0.96,0.5),−0.33)=−0.33
to the Seller (with limits): max(−F/S,−K)=min(max(−0.96,−0.5),0.33)=0.33

The maximum possible loss for the buyer is reduced from 1 unit to 1−1/K units. Thus a buyer for F=2.0 when K=1.5 would have exposure reduced from 1 unit to 0.33 units per unit of value of the contract.

In yet another alternative embodiment, options markets of call and put type may be mirrored. In this embodiment, the Exchange may be set up in a manner comparable to the earlier embodiments, but the settlement formulae are modified: a quantity P (the "premium") is defined for the exchange, and for a Buy-Sell agreed price F the payoff structure for settlement price S is given by the following modification of the settlement formula.

For a 'Call'-Type Exchange:
Buyer receives: max(F/S−1,0)−P
Seller Receives: min(1−F/S,0)+P
For a 'Put'-Type Exchange:
Buyer Receives: max(1−F/S,0)−P
Seller Receives: min(F/S−1,0)+P By way of example, suppose a 'Call'-type market with P=0.10, suppose the buyer and the seller agree on a contract price of F=10.0 and the resulting settlement price is S=8.0. In this embodiment, the payoffs are therefore as follows,
to the Buyer: max(10/8−1,0)−0.1=0.15
to the Seller: min(1−10/8,0)+0.1=−0.15
Had S been 11 instead of 8, then the payoffs above would have been instead,
to the Buyer: max(10/11−1,0)−0.1=−0.1
to the Seller: min(1−10/11,0)+0.1=0.1

In the above alternative embodiments, the operation of the Exchange is identical to that outlined in relation to the basic Futures Exchange according to the present invention.

Figure 6:
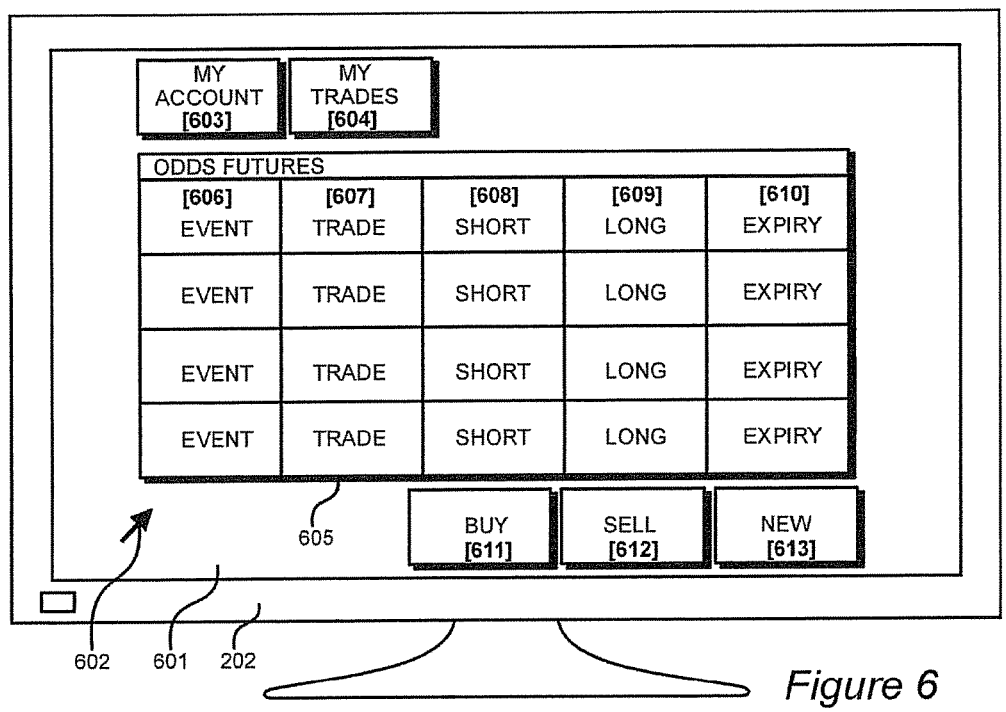
FIG. 6 provides a representation of a first embodiment of a graphical user interface displayed at any of the plurality of networked data processing terminals.

A preferred embodiment of the interface discussed above is illustrated in FIG. 6, for instance on the display of terminal 105 or 106. The interface 601 is shown displayed on VDU 202 and preferably comprises a number of user-operable sections, each having a respective functionality. The user operability may be implemented in a conventional manner, using either or both of keyboard 203 and mouse 204 for alphanumerical data input and for displacing an interface cursor 602 over a section and effecting a selection. Such a configuration is referred to as a 'point and click' interface, and is particularly useful for use with personal computers. It will be readily understood by those skilled in the art, however, that the characteristics and functionality, shortly to be described, of such an interface may be adapted for optimal use to the respective data input and display capacities of a vast number of very disparate data processing terminals, such as the example mobile telephone handset 106.

A first section 603 is a shortcut button to the user or terminal data 506 and any of the financial data 504, 505 respectively associated with that user or terminal data 506 stored in the database 503 of terminal 101. Button 603, when selected by translating pointer 602 over the section and providing a selection input, such as a mouse click or a keyboard stroke, results in a user- or terminal-specific data query being sent to terminal 101 over the network, and which will be replied to by terminal 101 with one or more query replies 507, specifically addressed to the requesting terminal using unique identification data 506. Button 603 may be used for a user to manage any number of preferences and/or configuration parameters defining his trading account as maintained by terminal 101.

A next section 604 is a shortcut button to the trading data 504 respectively associated with the user 506 logged at the terminal, or associated with the terminal 506. Again, button 604, when selected by translating pointer 602 over the section and providing a selection input, such as a mouse click or a keyboard stroke, results in a user- or terminal-specific data query being sent to terminal 101 over the network, and which will be replied to by terminal 101 with one or more query replies 507, specifically addressed to the requesting terminal using unique identification data 506. Button 604 may be used for a user to manage all of the trades 504 to which the user is a party or a counterparty.

A next section 605 provides a representation of the futures market and is preferably embodied as a user-configurable grid. The representation 605 of the market is preferably updated in real-time, with event data 606 obtained from exogenous market data 508 displayed in respect of each corresponding trade 607 (504, 509) offered for matching 608, 609 (510) by a trade counter-party 506. The corresponding matching data 608, 609 is preferably, although not necessarily, configured for allowing users to take (511) a short 608 or a long 609 position corresponding to the investment data 510. The representation 605 of the market is also preferably updated in real-time, with event expiry data 610 likewise obtained from exogenous market data 508 displayed in respect of each corresponding trade 607 (504, 509), and a preferred embodiment of the representation of expiry data may take the form of a running countdown to the expiry of the trading time allowed for the respective event 607.

The user-configurable functionality of the interface 601, particularly of representation 605 therein, may be implemented by permitting a user to index trades 607 (504, 509) on offer by type of exogenous market data 508 (e.g. event data 606), to selectively display only short position matching data 608 or long position matching data 609, to order trades 607 (504, 509) chronologically based on event expiry data 610 and it will be readily understood by those skilled in the art that any number of further configurations, particularly advantageous forms of which may allow for any single, combination, or all of the above, may be implemented, without departing from the scope of the present invention.

A next section 611 is a shortcut button to communicate a selection of matching data 608, 609 by the user or terminal 506 to terminal 101. Further to the selection of a trade 607 and/or of matching data 608 or 609 with cursor 602 by translating pointer 602 over representation 605 and providing a selection input, such as a mouse click or a keyboard stroke, the selection of button 611 results in the communication of the selection of the trade 607 and/or matching data 608 or 609 to terminal 101, at which it will be received as trading input data 511 for updating the database 503. The communication is uniquely associated with the communicating trade party or counterparty using unique identification data 506 associated with the terminal.

In the preferred embodiment, if a user 506 selects button 604, the representation 605 changes upon receipt of the data query reply 507 at the terminal, from the live market data to the trades 504 uniquely associated with the requesting user 506. The representation may be substantially the same as the example shown and described above, to the exception that trades 607 displayed now only comprise those to which the user is a party or counterparty. A next section 612 is a shortcut button to communicate a divestment of a trade 607 by the user or terminal 506 to terminal 101. Further to the selection of a trade 607 and/or matching data 608 or 609 to which the user is a party or counterparty, with cursor 602 by translating pointer 602 over representation 605 and providing a selection input, such as a mouse click or a keyboard stroke, the selection of button 612 results in the communication of an offer to sell the trade 607 to terminal 101, at which it will be again received as trading input data 511 for updating the database 503, but with a negative investment amount 608, 609 to be offset by an eventual buyer.

A next section 613 is a shortcut button to submit a new proposal for a trade 607 to terminal 101. Button 613, when selected by translating pointer 602 over the section and providing a selection input, such as a mouse click or a keyboard stroke, results in the communication of a selection of event data 508 and respective forecast data 509 and investment data 510 to terminal 101, at which it will be received and eventually processed as a new trade 504 uniquely associated with the communicating trade party or counterparty, using unique identification data 506 associated with the terminal or user from which the proposal was received. Adverting to the description above, the new trade data 504 appears as a trade 607 including event particulars 606, 610 and matching data 608, 609 in the live futures market representation 605 once the application 502 updates the database 503 with the proposal data.

Figure 7:
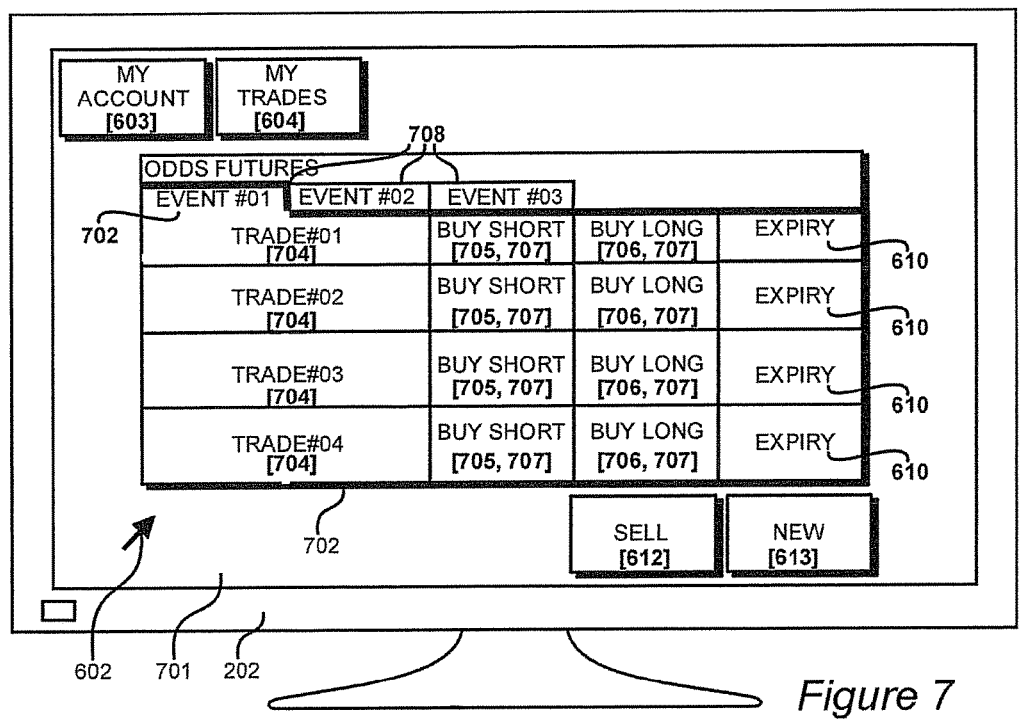
FIG. 7 provides a representation of a second embodiment of a graphical user interface displayed at any of the plurality of networked data processing terminals.

An alternative embodiment of the interface discussed above is illustrated in FIG. 7, for instance on the display of terminal 105 or 106. The interface 701 is shown displayed on VDU 202 and again comprises a number of user-operable sections, each having a respective functionality. The user operability may again be implemented in a conventional manner, using either or both of keyboard 203 and mouse 204 for alphanumerical data input and for displacing the interface cursor 602 over a section and effecting a selection.

The sections 603, 604, 612 and 613 are featured in interface 701 with substantially the same respective purpose and functions as previously described herein.

A next section 702 provides a representation of a futures market containing a plurality of events and is preferably again embodied as a user-configurable grid. The representation 702 of the market is preferably updated in real-time, with event data 703 obtained from exogenous market data 508 displayed in respect of each corresponding trade 704

(504, 509) offered for matching 705, 706 (510) by a trade counter-party 506. The corresponding matching data 705, 706 is preferably, although not necessarily, configured for allowing users to take (511) a short 705 or a long 706 position corresponding to the investment data 510. The representation 702 of the market is also preferably updated in real-time, with event expiry data 610 likewise obtained from exogenous market data 508 displayed in respect of each corresponding trade 704 (504, 509), and a preferred embodiment of the representation of expiry data may take the form of a running countdown to the expiry of the trading time allowed for the respective event 703. In a particularly advantageous implementation of this embodiment, the representation 702 includes tabulations 708 for selecting the respective user-configurable grid of any particular event of the plurality thereof, therefore the respective event data 703, trades 704 and matching data 705, 706 for same.

The user-configurable functionality of the interface 701, particularly of representation 702 therein, may be implemented by permitting a user to index trades 704 on offer by type of exogenous market data 508 (e.g. event data 703), to selectively display only short position matching data 705 or long position matching data 706, to order trades 704 (504, 509) chronologically based on event expiry data 610 and it will be readily understood by those skilled in the art that any number of further configurations, particularly advantageous forms of which may allow for any single, combination, or all of the above, may be implemented, without departing from the scope of the present invention.

In this embodiment, the respective representation of each matching data 705, 706 is configured as a shortcut button 707 to communicate a selection of matching data 705, 706 by the user or terminal 506 to terminal 101. Further to the selection of a trade 704 and/or of matching data 705 or 706 with cursor 602 by translating pointer 602 over representation 702 and providing a selection input, such as a mouse click or a keyboard stroke, the selection of any button 707 results in the communication of the selection of the trade 702 and/or matching data 705 or 706 to terminal 101, at which it will be received as trading input data 511 for updating the database 503. The communication is uniquely associated with the communicating trade party or counterparty using unique identification data 506 associated with the terminal.

Since the system is preferably intended for use with many remote terminals such as terminals 105 and 106, the interface 601 is preferably implemented as a file containing at least both instructions encoded in Hyper-Text Mark-up Language (HTML) and the data from terminal 101 described above and which, when received by each remote terminal in the environment of FIG. 1, may be processed for display as a user-interactive Internet page. Many variations may be readily envisaged by those skilled in the art, making use of any or all of Cascaded Style Sheets (CSS), extended Mark-up Language (XML), functional applets encoded in Javascript and the like, without departing from the scope of the present invention. Preferably still, because of the transactional character of the data exchanged between terminal 101 and remote terminals 105, 106, the file and/or the communication path is secured against tampering and/or unauthorised access or use, with any suitable security and/or encryption techniques, such as for instance securing each respective connection between terminals 101 and 105, 106 with secure HTTP (https), requesting terminal and/or user authentication at terminal 101 from any remote terminal 105, 106, and the like.

Exemplary embodiments of the present invention have been described herein. Those skilled in the art will understand, however, that changes and modifications may be made to these embodiments without departing from the true scope and spirit of the invention, which is defined by the claims.

What is claimed is:

1. A computing device for processing trades on odds-based markets, the computing device comprising a memory, a display unit, and a user input device, coupled to a processor, wherein the computing device communicates with a server system that maintains at least one odds-based exogenous reference market, the computing device being configured to:

receive from the server system:
  exogenous index odds, wherein the exogenous index odds comprise adjusted gross odds for one or more possible outcomes in a given sporting event offered by an online exogenous odds market, the sum of the inverse of the adjusted gross odds for all possible outcomes being about 1, wherein the odds for the one or more possible outcomes vary over a predetermined time bounded by an expiry that is prior to the respective outcome;
  short position matching data, the short position matching data representing one or more short positions offered for matching with respect to the one or more possible outcomes during the predetermined time, where the one or more short positions vary over the predetermined time;
  long position matching data, the long position matching data representing one or more long positions offered for matching with respect to the one or more possible outcomes during the predetermined time, where the one or more long positions vary over the predetermined time;
dynamically display in a graphical user interface on the display unit during the predetermined time a grid comprising a plurality of locations for receiving user commands via the graphical user interface, the plurality of locations comprising:
  a short position section, the short position section comprising one or more locations that dynamically display information regarding at least one of the one or more short positions, as the one or more short positions vary over the predetermined time; and
  a long position section, the long position section comprising one or more locations that dynamically display information regarding at least one of the one or more long positions, as the one or more long positions vary over the predetermined time;
obtain a selection of a particular location of the grid, the selection being obtained via a single action of the user input device at a particular time prior to the expiry; and
in response to another single action of the user input device, in a particular location of the graphical user interface, communicate the selection to the server system to be processed at the server system as a new trade that comprises the long or short position displayed in the particular location of the grid at the particular time, wherein a settlement value of the new trade is determined prior to the outcome of the sporting event.

2. The device of claim 1, wherein the computing device is further configured to dynamically display the exogenous index odds, the exogenous index odds being displayed as one or more percentages representing the one or more possible outcomes in the given event.

3. The device of claim 1, wherein the computing device is further configured to dynamically display the exogenous index odds to represent probabilities of the one or more possible outcomes, wherein the sum of the probabilities for all possible outcomes is 100%.

4. The device of claim 1, wherein the computer device is a mobile telephone handset.

5. The device of claim 1, wherein the computing device is further configured to dynamically display the exogenous index odds for the one or more possible outcomes as one or more percentages and receive a selection from the user representing a choice of a short or long position.

6. The device of claim 1, wherein processing trades includes processing at least one of: a derivative product and a bet.

7. The device of claim 1, wherein:
the information regarding at least one of the one or more short positions comprises at least the short odds offered for matching by a trade counter-party; and
the information regarding at least one of the one or more long positions comprises at least the long odds offered for matching by a trade counter-party.

8. The device of claim 1, wherein the grid further comprises an event section, the event section comprising one or more locations that display information regarding the respective outcome.

9. The device of claim 1, wherein the grid further comprises an expiry section, the expiry section comprising one or more locations that display information regarding the expiry of the respective outcome.

10. The device of claim 9, wherein the information regarding the expiry of the respective outcome comprises a running countdown to the expiry of the trading time allowed for the respective outcome.

11. The device of claim 1, wherein the computing device is further configured to:
receive from the server system information regarding one or more active trades previously processed by the server as new trades, the information comprising at least the settlement value; and
display the information.

12. The device of claim 11, wherein the grid further comprises:
a trades section, the trades section comprising one or more locations that dynamically display information regarding one or more active trades previously processed by the server as new trades; and
a divestment input; and
the computing device is further configured to:
obtain a selection from a user comprising one or more of the active trades displayed in the trades section of the grid, the selection being obtained via a single action of the user input device at a particular time prior to the expiry; and
in response to another single action of the user input device selecting the divestment input, communicating information regarding the selected one or more active trades to the server to be registered by the server as a new offer to sell the selected one or more active trades.

13. The device of claim 1, wherein the new trade further comprises an investment amount.

14. A system for processing options contracts on sporting event odds markets, the system comprising:
a server comprising at least one server processor coupled to a server memory containing instructions operable to cause the server to:
adapt a graphical user interface to respective data input and display capacities of a plurality of disparate data processing terminals;
define a premium P;
register an options contract between a buyer and a seller, the options contract comprising a forecast F of a value for odds S of an outcome of a sporting event that will be offered by an online exogenous odds market prior to the outcome, wherein the odds vary over a time T that expires prior to the outcome;
determine S from the online exogenous market;
calculate a buyer payoff based on F and S with a debit for the premium;
calculate a seller payoff based on F and S with a credit for the premium; and
adjust a buyer account by an amount of the buyer payoff and adjust a seller account by an amount of the seller payoff, wherein calculating the buyer payoff and calculating the seller payoff are both completed prior to the outcome of the sporting event; and
at least one data processing terminal in communication with the server, the terminal comprising:
a terminal memory, a display unit, and a user input device, coupled to a terminal processor, the terminal memory containing instructions operable to cause the terminal to:
receive from the server:
the gaphical user interface;
short position matching data, the short position matching data representing one or more short positions offered for matching with respect to the outcome during the time T, where the one or more short positions vary with the odds S over the time T;
long position matching data, the long position matching data representing one or more long positions offered for matching with respect to the outcome during the time T, where the one or more long positions vary with the odds S over the time T;
dynamically display in a graphical user interface on the display unit during the time T a grid comprising a plurality of locations for receiving user commands via the graphical user interface, the plurality of locations comprising:
a short position section, the short position section comprising one or more locations that dynamically display information regarding at least one of the one or more short positions, as the one or more short positions vary with the odds S over the time T; and
a long position section, the long position section comprising one or more locations that dynamically display information regarding at least one of the one or more long positions, as the one or more long positions vary with the odds S over the time T;
obtain a selection of a particular location of the grid, the selection being obtained via a single action of the user input device at a particular time within the time T;
in response to another single action of the user input device, in a particular location of the graphical user interface, communicate the selection to the server to be registered by the server as a new options contract that comprises the odds S of the long or short position displayed in the particular location of the grid at the particular time.

15. The system of claim 14, wherein:
the options contract comprises a call option,
calculating the buyer payoff includes calculating (F/S−1), and
calculating the seller payoff includes calculating (1−F/S).

16. The system of claim 15, wherein the buyer payoff includes max(F/S−1, 0)−P and the seller payoff includes min (1−F/S, O)+P.

17. The system of claim 14, wherein:
the options contract comprises a put option,
calculating the buyer payoff includes calculating (1−F/S), and
calculating the seller payoff includes calculating (F/S−1).

18. The system of claim 14, wherein determining S from the exogenous market comprises determining a median of a latest percentage of volume on a reference market.

19. The system of claim 14, wherein determining S from the exogenous market comprises determining a trimmed mean of the latest percentage of volume on a reference market.

20. The system of claim 14, further comprising a futures trade database configured to store the registered options contract and settlement data comprising at least a unique identifier for the buyer and a unique identifier for the seller.

21. A method for processing trades in odds-based markets using a graphical user interface of a computing device in communication with a server system that maintains at least one odds-based exogenous reference market, the method comprising:
receiving from the server system:
exogenous index odds, wherein the exogenous index odds comprise adjusted gross odds for one or more possible outcomes in a given sporting event offered by an online exogenous odds market, the sum of the inverse of the adjusted gross odds for all possible outcomes being about 1, wherein the odds for the one or more possible outcomes vary over a predetermined time bounded by an expiry that is prior to the respective outcome;
short position matching data, the short position matching data representing one or more short positions offered for matching with respect to the one or more possible outcomes during the predetermined time, where the one or more short positions vary over the predetermined time;
long position matching data, the long position matching data representing one or more long positions offered for matching with respect to the one or more possible outcomes during the predetermined time, where the one or more long positions vary over the predetermined time;
dynamically displaying in the graphical user interface during the predetermined time a grid comprising a plurality of locations for receiving user commands via the graphical user interface, the grid comprising:
a short position section, the short position section comprising one or more locations that dynamically display information regarding at least one of the one or more short positions, as the one or more short positions vary over the predetermined time; and
a long position section, the long position section comprising one or more locations that dynamically display information regarding at least one of the one or more long positions, as the one or more long positions vary over the predetermined time;
obtain a selection of a particular location of the grid, the selection being obtained via a single action of a user input device at a particular time prior to the expiry;
in response to another single action of the user input device, in a particular location of the graphical user interface, communicate the selection to the server system to be processed at the server system as a new trade that comprises the long or short position displayed in the particular location of the grid at the particular time, wherein a settlement value of the new trade is determined prior to the outcome of the sporting event.

22. The method of claim 21, wherein:
the information regarding at least one of the one or more short positions comprises at least the short odds offered for matching by a trade counter-party; and
the information regarding at least one of the one or more long positions comprises at least the long odds offered for matching by a trade counter-party.

23. The method of claim 21, wherein the grid further comprises an event section, the event section comprising one or more locations that display information regarding the respective outcome.

24. The method of claim 21, wherein the grid further comprises an expiry section, the expiry section comprising one or more locations that display information regarding the expiry of the respective outcome.

25. The device of claim 24, wherein the information regarding the expiry of the respective outcome comprises a running countdown to the expiry of the trading time allowed for the respective outcome.

26. The method of claim 21, further comprising:
receiving from the server system information regarding one or more active trades previously processed by the server as new trades, the information comprising at least the settlement value; and
displaying the information.

27. The method of claim 26, wherein the grid further comprises:
a trades section, the trades section comprising one or more locations that dynamically display information regarding one or more active trades previously processed by the server as new trades; and
a divestment input; and
the method further comprises:
obtaining a selection from a user comprising one or more of the active trades displayed in the trades section of the grid, the selection being obtained via a single action of the user input device at a particular time prior to the expiry; and
in response to another single action of the user input device selecting the divestment input, communicating information regarding the selected one or more active trades to the server to be registered by the server as a new offer to sell the selected one or more active trades.

28. The method of claim 21, wherein the new trade further comprises an investment amount.

\* \* \* \* \*